350-334
OR  3,954,325

United States

Borden

[11] 3,954,325
[45] May 4, 1976

[54] MULTILAYER CERAMIC-BASED LIQUID CRYSTAL DISPLAY

[75] Inventor: Howard C. Borden, La Jolla, Calif.

[73] Assignee: Ceramic Systems, San Diego, Calif.

[22] Filed: May 28, 1974

[21] Appl. No.: 473,545

[52] U.S. Cl. .......................................... 350/160 LC
[51] Int. Cl.² ............................................ G02F 1/13
[58] Field of Search ............................. 350/160 LC

[56] References Cited
UNITED STATES PATENTS

| | | | |
|---|---|---|---|
| 3,505,804 | 4/1970 | Hofstein.................. | 350/160 LC UX |
| 3,603,984 | 9/1971 | Heilmeier et al. ...... | 350/160 LC UX |
| 3,647,280 | 3/1972 | Klein et al. ............. | 350/160 LC |
| 3,694,053 | 9/1972 | Kahn ....................... | 350/160 LC X |
| 3,716,290 | 2/1973 | Borel et al. .............. | 350/160 LC |
| 3,756,694 | 9/1973 | Soref et al. .............. | 350/160 LC |

*Primary Examiner*—John K. Corbin
*Assistant Examiner*—Matthew W. Koren
*Attorney, Agent, or Firm*—Ronald E. Grubman

[57] ABSTRACT

The present invention provides an optical display device including a liquid crystal display integrated into a multilayer ceramic substrate assembly. The ceramic substrate may include cavities in which are embedded integrated circuits which activate the display. A three-dimensional electrical conducting network is used to interconnect the integrated circuits with a display pattern etched in a metalized layer on one surface of the ceramic substrate. Electrical connections to the display pattern are made directly from within the substrate, thereby eliminating the need to etch electrical access leads in the metallic surface. A single upper conducting plate is separated from the ceramic substrate by a window-like conducting spacer to form a cell in which a liquid crystal material may be contained. No display pattern nor electrical access leads are etched in the upper plate. Instead, the conducting spacer provides the only electrical connection to the upper plate. In accordance with one embodiment of the invention, a liquid crystal of the dynamic-scattering type is used in the display. In accordance with another embodiment of the invention, a liquid crystal of the field-effect type is used.

5 Claims, 3 Drawing Figures

MULTILAYER CERAMIC-BASED LIQUID CRYSTAL DISPLAY

BACKGROUND OF THE INVENTION

This invention is concerned generally with the use of multilayer ceramic substrates in connection with optical display devices and more specifically with the use of a liquid crystal cell display integrated into a multilayer ceramic substrate assembly.

Multilayer ceramic technology has been used in the prior art in connection with liquid crystal displays, e.g., in the manufacture of electronic watches. Typically, a ceramic substrate is used as an electrical interconnect vehicle between a liquid crystal display and one or more printed circuit boards mounted on a surface of the substrate. In these prior art displays, it is common to utilize a liquid crystal cell consisting of a pair of transparent conducting plates separated to form a cavity in which a liquid crystal material is contained. Elements of a display pattern are etched into both of the conducting plates. Displays of this type typically accomplish electrical connection between the ceramic substrate and the display pattern on the conducting plates through a number of conducting stripes, or access leads, also etched on the conducting plates. To eliminate unwanted electrical fields in regions of the liquid crystal in the vicinity of the access leads, it has been necessary to elaborately etch both the upper and lower conducting plates in such a way as to avoid undesired overlap of the electrical conductors. Very precise alignment of the two conducting plates is also required to avoid unwanted fields. For these reasons, it has been difficult to manufacture devices having complicated optical display patterns at reasonable cost.

Additionally, for some particular applications such as electronic wrist watches it would be desirable to have a display of greatly reduced thickness and increased ruggedness and reliability.

SUMMARY OF THE INVENTION

In accordance with the illustrated preferred embodiments, the present invention provides an optical display including a liquid crystal cell integrated into a multilayer ceramic substrate structure in which integrated circuits which activate the display may be embedded. More particularly, a highly polished metalized reflecting layer is deposited on one surface of the ceramic substrate, certain regions of the metalized surface being electrically isolated from the remainder of the surface to serve as generating elements of a display pattern. An upper transparent conducting plate is separated from the metalized layer by a spacer to form a cavity in which a liquid crystal material may be contained. Electrical connections from the integrated circuits in the ceramic substrate to the elements of the metalized display pattern are made through electrical conducting networks embedded in the multilayer substrate. Electrical conducting conduits or "vias" extend throughout the substrate, permitting three-dimensional electrical connections among the embedded networks. In particular, the conducting vias may be brought through the ceramic directly up to the metalized pattern on the surface, thereby providing electrical connection with each element of the pattern directly from within the substrate. Since there are no superfluous leads required to make electrical contact with the elements of the metalized pattern, there is no necessity to etch the upper conducting plate in an elaborate fashion to avoid unwanted electrical fields in the display. Rather, the entire upper plate may serve as a single conductor which may be electrically accessed through the supporting spacer.

In accordance with one embodiment of the invention, a nematic liquid crystal of the dynamic-scattering type is employed to provide a reflective display. When no electric fields are present in the liquid crystal, ambient light is reflected uniformly from the polished metal layer. As is known in the art, however, if an electric field is established in certain regions of the display (by applying an electrical voltage to selected ones of the metallic elements) these regions will appear opaque, while the remainder of the display will appear transparent. Thus, different optical indications may be provided by activating particular ones of the metallic elements.

In accordance with another embodiment of the invention, a nematic liquid crystal material of the field-effect type is employed. As is generally known in the art, the field-effect type liquid crystal rotates the polarization of light passing through it. In this embodiment of the device surfactants are used to coat the inner surfaces of the display cavity and a polarizer is inserted in the cavity, preferably adjacent to the top plate. Ambient light is incident on the cavity through the top layer and is circularly polarized by the polarizer. The light is transmitted through the liquid crystal and reflected from the metallic elements forming the pattern. The polarization of the light may be varied in different regions of the display depending on whether particular metallic elements are electrically activated or not. Thus, a contrast may be provided between different regions of the display thereby allowing the optical presentation of different patterns.

Since both of the above-described preferred embodiments of the invention provide that electrical connections from the integrated circuit to the display device are accomplished through a three-dimensional conducting network embedded in a multilayer ceramic substrate, there are no constraints resulting from the necessity of electrical access leads to either the metallic elements forming the pattern or to the top conducting plate. The invention thus provides an optical display device of reduced size and increased reliability, while possessing great flexibility in the possible patterns which may be displayed.

DESCRIPTION OF THE INVENTION

Figure 1A:
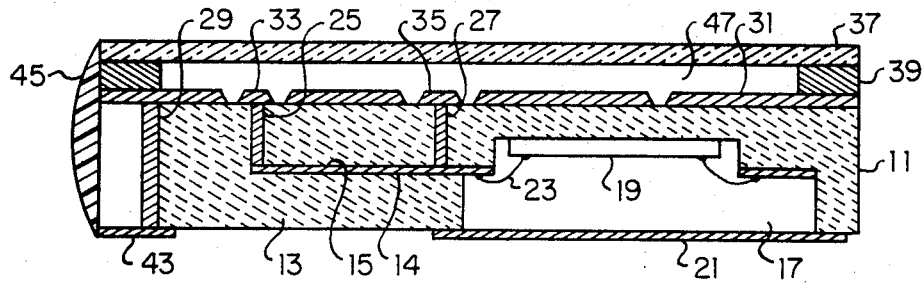
FIGS. 1A and 1B illustrate an optical display of the dynamic-scattering type according to a preferred embodiment of the invention.

In FIG. 1A there is shown a multilayer ceramic substrate 11. For purposes of illustration, ceramic substrate 11 is shown as including two ceramic layers 13 and 15. More generally, however, multilayer substrates including different numbers of layers may be used in the invention to provide structures of varying degrees of complexity. Included within the body of ceramic substrate 11 is a cavity 17. An integrated circuit 19 is positioned within cavity 17 and mounted on the underside of layer 15 of the ceramic substrate. Integrated circuit 19 may be used to provide electronic control of te optical display of the present invention. If it is desired to employ more than one integrated circuit in the device, the ceramic substrate may include additional cavities to accommodate additional circuits. A cover 21 which is preferably of ceramic or metal is hermetically sealed against the bottom surface of ceramic substrate 11 to provide a hermetically sealed environment for integrated circuit 19. In addition to offering protection to the integrated circuits, the encasing of the circuits in cavities within the body of the ceramic substrate makes possible the manufacture of display devices of narrow width, a particularly desirable feature for applications such as electronic wrist watches.

To provide electrical connection between integrated circuit 19 and the optical display portion of the invention, a layer of electrically conducting elements constituting a conducting network is included between ceramic layers 13 and 15. This conducting network is indicated in schematic cross section by the region labeled 14; the fabrication of such a network is described in detail in U.S. Pat. No. 3,423,517 entitled "Monolithic Ceramic Electrical Interconnecting Structure," issued to G. Arrhenius on Jan. 21, 1969. A conducting lead 23 is bonded between integrated circuit 19 and the electrical conducting network 14; lead 23 represents one of a number of such connections which may be made. Conducting network 14 may be fabricated in whatever pattern is required to electrically connect components of the integrated circuit to the optical display portion of the invention.

Also included within the ceramic substrate are a number of vertical metallic interconnections 25, 27, and 29. These electrical connections or "vias" extend vertically through the ceramic layers and permit electrical connection between the electrical conducting structure 14 and an optical display positioned on the top surface of substrate 11. In devices utilizing a larger number of ceramic layers, electrical conducting networks may be included between each layer. In that case, the vertical vias may be interconnected among the various conducting layers, thereby providing an effective three-dimensional electrical network. The fabrication of a vertical network of the type of interest is also described in detail in U.S. Pat. No. 3,423,517 noted above. The use of the above-described structure enables complicated electrical conducting networks to be included completely within the ceramic structure itself and away from the optical display, making possible the fabrication of intricate displays without many of the complications known in the art (and described more particularly below).

According to the invention, a highly polished metalization layer is formed on the top surface of ceramic substrate 11. The metalized layer should be flat, preferably on the order of 0.00025 inch total deviation over the area of the display, and should be of a metal which may be highly polished. Such metals as nickel or chromium have been found to be suitable. Electrical isolation is provided between different regions of the metalized layer by deposition of the patterned metal layer, e.g., by "silk screening" or by etching away small portions to provide electrical isolation. Thus, the various regions which are electrically isolated one from another may serve as elements of a display pattern on the surface of the substrate. For example, by reference to FIGS. 1A and 1B it may be seen that a metalized region 33 is separated by a small gap from the remainder of the metal layer. Similarly, another portion 35 is also electrically isolated from the remainder of the layer. Metallic regions 33 and 35 may therefore serve as elements of a display pattern on the surface of the substrate. In accordance with the invention, electrical connection to metallic elements 33 and 35 is made directly from within ceramic substrate 11 by metallic vias 25 and 27 respectively. Vias 25 and 27 thus serve to connect the metallic display elements with the electrical conducting network 14 embedded at the interface of ceramic layers 13 and 15, which network is in turn connected with the integrated circuit 19. In the case of devices which include more numerous layers of ceramic electrical conducting networks, metallic vias such as 25 and 27 can provide connections among the conducting networks and also between the optical display and all of the various networks. Since the display elements 33 and 35 are electrically accessed directly from below there is no necessity to etch any electrical input or output leads whatsoever into the metallic layer.

Figure 1B:
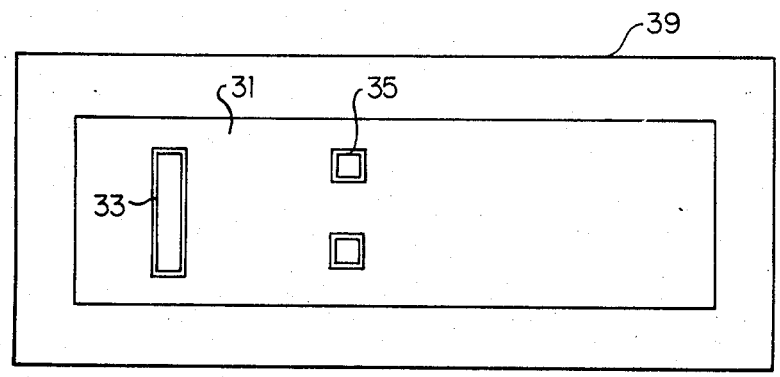

In FIG. 1A there is further illustrated a plate 37 having a single conducting surface which functions as a second electrically conductive element of the optical display. Typically, plate 37 consists of a glass plate coated on its interior surface with a transparent conductive coating such as InO or SnO. In the illustrated embodiment, electrical connection is made to conducting plate 37 through a metallic spacer 39 positioned between ceramic substrate 11 and conducting plate 37. The window-frame shape of spacer 39 is illustrated in FIG. 1B. Spacer 39 is electrically connected to a metallic via 29 which is itself electrically interconnected with a sheet of contact metalization 43 positioned on the rear surface of ceramic substrate 11, to function, e.g., as a ground connection. Thus, a single electrical connection is made to the entire conducting sheet 37, eliminating the necessity to have complicated patterns and electrical input and output leads etched on the top plate as was typically required in the prior art. These patterns were required to eliminate unwanted electric fields which would otherwise be generated in regions where electrical input and output leads were present on the lower plate. Thus, it was common to etch the upper conductor so that unwanted pairs of patterns on the upper and lower plates did not coincide. In addition to the etching of the upper plate necessary to establish the pattern, this required very precise positioning of the two plates. None of these etching processes or precise alignment are required in the present device, since all of the complexities of electrical access to the display may be accomplished within the ceramic substrate as described above.

In addition to functioning as an electrical connection to plate 37, spacer 39 creates a cavity 47 between conducting plate 37 and metallic layer 31 in which a liquid crystal material may be contained. An epoxy seal 45 completes the device. It may be seen that the epoxy 45 does not come into direct contact with the liquid crystal material, but rather contacts the metallic spacer 39. This eliminates any difficulties of maintaining chemical purity of the liquid crystal material which in the prior art tended to degrade the operation of the display. Such an arrangement was not possible in displays including input and output electrical leads on the top surface, since the use of a single window-frame shaped spacer would short all of the electrical leads together. An alternative embodiment may be constructed in which the metallic spacer 39 is eliminated.

Instead, a surface of ceramic substrate 11 is built up to form a shoulder which establishes the cavity 47 for holding the liquid crystal material. In such an embodiment, electrical connection to the upper conducting plate can be made directly by a metallic via extending through the shoulder, and again an epoxy sealant would be prevented from contacting the liquid crystal material.

The present invention may be operated in a reflective mode whereby ambient light is utilized to provide an optic display. In this illustrated embodiment, cavity 47 may be filled with a nematic liquid crystal of the dynamic-scattering type as is generally known to those skilled in the art. Typical examples of such liquid crystals are Schiff base, azo, and azoxy families. When no electric fields are applied to the liquid crystal, ambient light passing through the transparent upper plate 37 will be reflected approximately uniformly from the entire reflective metal surface 31. However, when particular ones of the metallic elements such as element 33 are electrically activated by the control integrated circuit 19, an electric field is set up in the liquid crystal which tends to scatter light in those regions. A visual contrast is thus provided which serves as an optical display.

Figure 2:
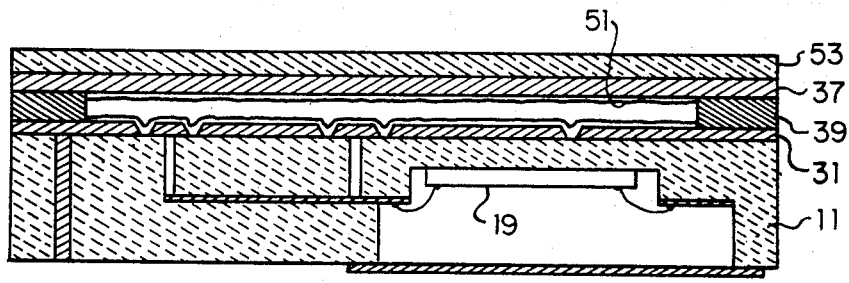
FIG. 2 illustrates an optical display of the field-effect type according to another preferred embodiment of the invention.

In FIG. 2 there is again shown a multilayer ceramic substrate structure 11. A window-frame spacer 39 provides a separation between an upper conducting plate 37 and substrate 11, thereby forming a cavity 47 in which a nematic liquid crystal of the "field-effect" type may be contained. An example of such a field-effect type liquid crystal is Eastman Nematic Field-Effect Mixture No. 24546 manufactured by the Eastman Kodak Company in Rochester, N.Y. In accordance with this embodiment of the invention, a surfactant such as Lecithim or SiO is used to coat the inner surfaces of both the conducting plate 37 and a metalization layer 31 such as that described in connection with FIGS. 1A and 1B. The surfactant is applied to those surfaces to align the liquid crystal molecules in a manner familiar to those skilled in the art. A circular polarizing plate 53 is affixed to the top surface of conducting plate 37. In operation, ambient light passing into the liquid crystal cell will be circularly polarized by polarizer 53. If no electric fields are established in the liquid crystal, the polarized light will be transmitted through the crystal cell, reflected from metallic reflecting surface 31, and retransmitted through the upper plate. However, as is known in the art, if electric fields are set up in certain regions of the cell, the polarization of the light will be altered, so that the reflected light will not be retransmitted out of the cell. These regions will thus contrast with the regions of transmitted light, thereby providing the required optical contrast for a display. The electric fields which create the optical display are controlled by an integrated circuit 19 which is electrically interconnected with certain elements of metallic layer 31 through electrical conducting networks and vias in the ceramic substrate, in the same manner as was described in connection with the embodiment illustrated in FIGS. 1A and 1B. It has been found that operation of this field-effect type device requires less electrical power than the dynamic-scattering type device, so that the present embodiment may be particularly useful in connection with very small optical displays, for example, those used in electronic watches.

I claim:

1. An electro-optic display device comprising:
    a multiplayer ceramic substrate including a plurality of ceramic layers and at least one cavity therein;
    at least one electronic circuit positioned within said at least one cavity in the ceramic substrate;
    a metalized layer on a surface of the ceramic substrate, the layer including a plurality of metalized display elements electrically isolated from each other and from the remainder of the metalized layer;
    a three-dimensional network of electrical conducting elements buried within the ceramic substrate, the network including at least one electrical conducting layer between adjacent ones of the ceramic layers, and a plurality of elongated electrical conducting elements extending throughout the ceramic layers, the network being interconnected with the electronic circuits and also directly interconnected with the metalized display elements from within the ceramic substrate by means of the elongated electrical conducting elements;
    a transparent conducting plate mounted in opposition to the metalized layer, and spaced apart from the metalized layer to form a cell for containing a liquid crystal material, the conducting plate being electrically interconnected with the three-dimensional conducting network; and
    a quantity of liquid crystal material within the cell.

2. An electro-optic display as in claim 1 further including a conducting spacer mounted on said surface of the ceramic substrate and being electrically interconnected with the three-dimensional conducting network, for spacing the transparent conducting plate apart from the metalized layer and for providing electrical interconnection between the conducting plate and the three-dimensional conducting network.

3. An electro-optic display as in claim 1 wherein said at least one cavity in which the electronic circuits are positioned is hermetically sealed.

4. An electro-optic display as in claim 1 wherein the liquid crystal material is of the dynamic-scattering type.

5. An electro-optic display as in claim 1 wherein the liquid crystal material is of the field-effect type and the display further includes:
    polarizing means for polarizing light incident on the display; and
    a surfactant coating on the metalized layer and on a surface of the transparent conducting plate facing the metalized layer, for aligning the molecules of the liquid crystal material in an ordered manner.

* * * * *